W. A. LIPPINCOTT.
RADIAL THRUST BEARING.
APPLICATION FILED MAR. 1, 1917.
1,282,888.
Patented Oct. 29, 1918.
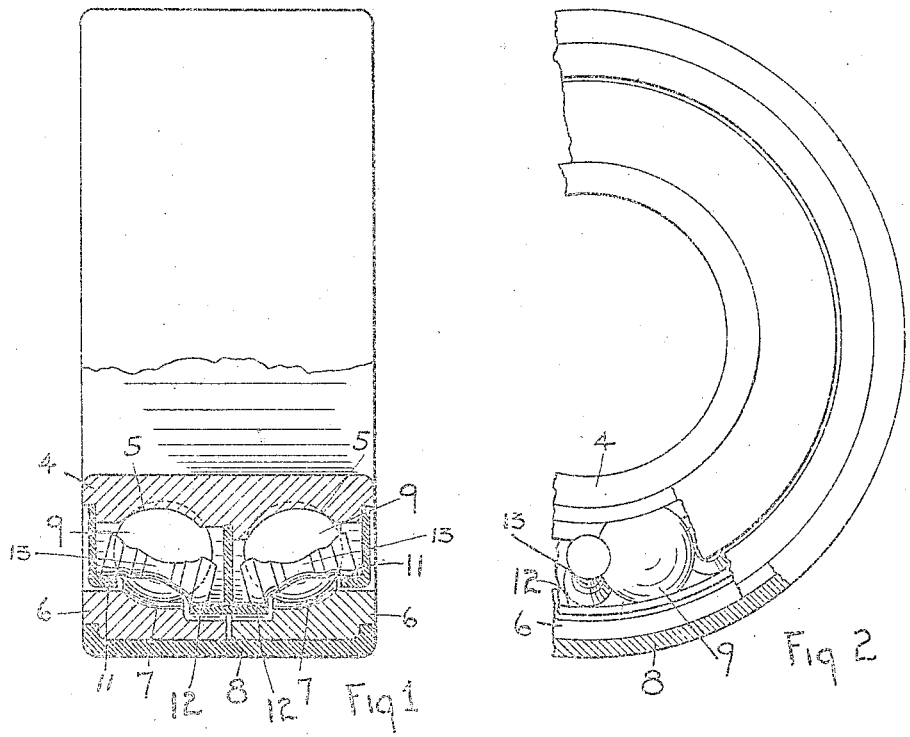
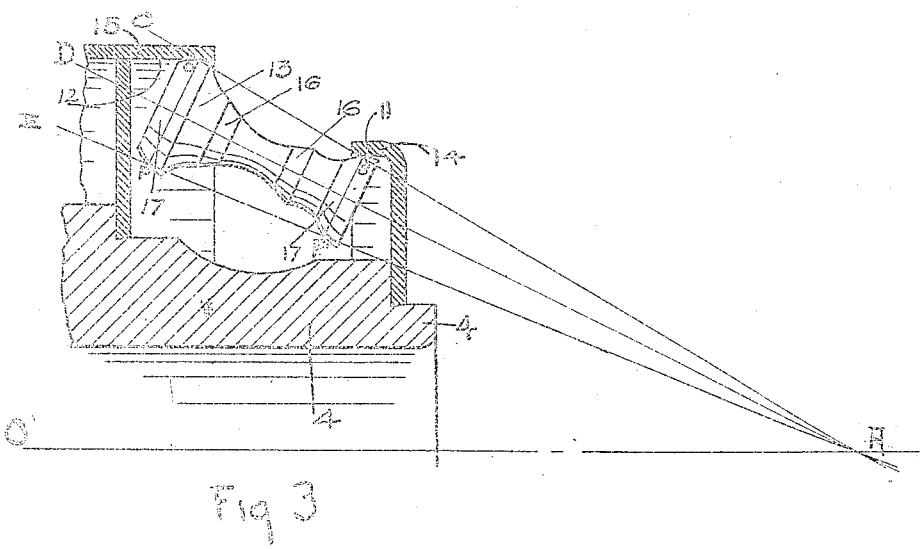
INVENTOR
WELLS A. LIPPINCOTT
BY
ATTORNEYS

UNITED STATES PATENT OFFICE.

WELLS A. LIPPINCOTT, OF GREAT NECK, NEW YORK, ASSIGNOR, BY MESNE ASSIGNMENTS, TO MARLIN-ROCKWELL CORPORATION, OF NEW HAVEN, CONNECTICUT, A CORPORATION OF NEW YORK.

RADIAL-THRUST BEARING.

1,282,888.   Specification of Letters Patent.   Patented Oct. 29, 1918.

Application filed March 1, 1917. Serial No. 151,710.

*To all whom it may concern:*

Be it known that I, WELLS A. LIPPINCOTT, a citizen of the United States of America, and a resident of Great Neck, Long Island, New York, have invented certain new and useful Improvements in Radial-Thrust Bearings, of which the following is a specification.

This invention relates to anti-friction bearings in which the roller bearing members are separated by rolling separating members, which normally run on tracks the proportioning of all of the parts being such that only rolling friction occurs. Within this type of bearings my invention relates more especially to bearings commonly known as radial thrust bearings, *i. e.*, bearings which are capable of carrying either radial or thrust loads, or loads which combine both of these characteristics. In such a bearing the axes of rotation of the separating members are inclined to the axis of rotation of the bearing.

In United States Letters Patent to Louis H. Seubert, No. 1,218,605, March 6, 1917, are set forth in connection with Figure 11 thereof certain relations between the contacting surfaces of tracks separating members and bearing members. It is there explained that the circles of contact between each end of the separating roller and its track should lie in a cone having its apex on the axis of rotation of the bearing. In the particular figure referred to the faces of the entire surfaces of the tracks are illustrated as lying in the cone.

In a bearing following this construction, it is evident that under certain conditions there will be a lateral resultant of the centrifugal force which will tend to cause the separating members to work sidewise along the tracks and produce certain strains which it may be advisable to avoid. It is further evident that great accuracy in forming the tracks and in mounting them on the bearing is required.

The object of this invention is the production of a bearing of the general character referred to in which this lateral resultant of the centrifugal force in the separating roller is eliminated, and which also eliminates the said nicety of construction of the tracks and their mounting on the bearings.

In the accompanying sheet of drawings which form a part of this application I have illustrated one form of my invention for the purpose of making the same clear, but it is to be understood that these drawings are for illustration only and that my invention is not limited to the precise showing thereof.

In these drawings Fig. 1 is a view of one form of my invention, partly in vertical cross section and partly in side elevation, rolling bearing members in the form of balls and rolling separating members in the form of rollers being illustrated; and Fig. 2 is a view of the embodiment of Fig. 1 being partly in front elevation and partly broken away in the section; and Fig. 3 is a diagrammatic cross section illustrating the relation of tracks and separating roller of the embodiment shown in Figs. 1 and 2.

The bearing herein illustrated comprises an inner raceway member 4 in which are located two runways 5 5, and a two piece outer raceway member 6 provided with runways 7 7 and suitably held together by a sleeve 8, balls 9 9 being interposed between the raceway members. On the inner raceway member are suitably carried two outer tracks 11 11 and two inner tracks 12 12 upon which tracks in normal operation of the bearing run separating members 13 13.

Referring to Fig. 3 wherein the construction of the tracks and separator relation is more clearly illustrated than in the other two figures, the tracks 11 and 12 are here illustrated as being formed on the inner face of supporting members 14 and 15 respectively which are suitably mounted upon the inner raceway member 4. The tracks are cylindrical in shape and the axes of their cylinders coincide with the axes of rotation of the bearing.

The separating roller 13 is intended to be properly proportioned in its relation to the tracks and the balls so that there is only rolling friction between these members. It is provided with raised annular separating flanges 16 16 for engagement with the balls and rounded contacting portions 17 17 for engagement with the tracks. These rounded portions assure a single point engagement with the tracks on circles of contact O P in respect to track 12 and O' P' in respect to track 11. The construction of the rounded portions should preferably be such that these circles of contact lie in a cone whose apex is at the point of intersection between the axes of rotation of the separating rollers and the axis of rotation of the bearing. This cone is illustrated by lines C A E, the axis of rotation of the separating roller by the line A and the axis of rotation of the bearing by line O A.

By reason of the cylindrical construction of the tracks as above described it is evident that there is no lateral resultant of the centrifugal forces generated by the rotation of the bearing; furthermore that great freedom in mounting and supporting the tracks upon the runway exists, for so long as the correct cylindrical diameters of the tracks are maintained the proper operation of the bearing is assured. The maintenance of the said correct cylindrical diameters of the tracks is a simple and inexpensive matter as compared with tracks which themselves lie in the surface of the cone C A E.

The foregoing detailed description has been given for clearness of understanding and no undue limitation should be deduced therefrom but the appended claims should be construed as broadly as permissible in view of the prior art.

What I claim as new and desire to secure by Letters Patent of the United States is:

1. In an anti-friction bearing the combination of relatively movable runways, rolling bearing members, rolling separating members the axes of rotation of which are inclined to the axis of rotation of the bearing, and tracks for the separating members, which tracks lie in the surfaces of cylinders, the axes of which are coincident with the axis of rotation of the bearing, substantially as described.

2. In an anti-friction bearing the combination of relatively movable runways, rolling bearing members, rolling separating members, and tracks for the separating members, the separating members having their axes of rotation inclined to the axis of rotation of the bearing and being provided with rounded portions for engagement with the tracks, the tracks lying in the surfaces of cylinders, the axes of which are coincident with the axis of rotation of the bearing, substantially as described.

3. In an anti-friction bearing the combination of relatively movable runways, rolling bearing members, rolling separating members, and tracks for the separating members, the separating members having their axes of rotation inclined to the axis of rotation of the bearing and being provided with rounded portions for single point engagement with the tracks, the tracks lying in the surfaces of cylinders, the axes of which are coincident with the axis of rotation of the bearing, substantially as described.

4. In an anti-friction bearing the combination of relatively movable runways, rolling bearing members, rolling separating members, and tracks for the separating members, the separating members having their axes of rotation inclined to the axis of rotation of the bearing and being provided with rounded portions for single point engagement with the tracks, the circles of contact in these rounded engaging portions lying in a cone whose apex is at the point of intersection between the axes of rotation of the separating members and the axis of rotation of the bearing, substantially as described.

5. In an anti-friction bearing the combination of relatively movable runways, rolling bearing members, rolling separating members, and tracks for the separating members, the separating members having their axes of rotation inclined to the axis of rotation of the bearing and being provided with rounded portions for single point engagement with the tracks, the centers of the circles of curvature of the said rounded portions in axial planes of the bearing and at the points of contact between the separating members and the tracks lying respectively in the radii of the bearing intersecting the said points of contact, the circles of contact of the said rounded portions lying in a cone whose apex is at the point of intersection between the axes of rotation of the separating members and the axis of rotation of the bearing, substantially as described.

6. In an anti-friction bearing the combination of relatively movable runways, rolling bearing members, rolling separating members and tracks for the separating members, the separating members having their axes of rotation inclined to the axis of rotation of the bearing and being provided with rounded portions for single point engagement with the tracks, the centers of the circles of the curvature of the said rounded portions in axial planes of the bearing and at the points of contact between the separating member and the tracks lying respectively in radii of the bearing intersecting the said points of contact, the circles of contact in said rounded portions lying in a cone whose apex is at the point of intersection between the axes of rotation of the separating members and the axis of rotation of the bearing, the tracks lying in the surfaces of cylinders the axes of which are coincident with the axis of rotation of the bearing, substantially as described.

Signed at New York, N. Y., this 28th day of February, 1917.

WELLS A. LIPPINCOTT.

Witnesses:
AXEL L. WESTMAN,
GEORGE H. GILMAN.